United States Patent [19]

Bottka et al.

[11] 4,350,413

[45] Sep. 21, 1982

[54] MULTI-COLOR TUNABLE FILTER

[75] Inventors: Nicholas Bottka, Ridgecrest, Calif.; Howard Lessoff, Potomac, Md.

[73] Assignee: The United States of America as represented by the Secretary of the Navy, Washington, D.C.

[21] Appl. No.: 140,352

[22] Filed: Apr. 14, 1980

[51] Int. Cl.³ .............................................. G07F 1/03
[52] U.S. Cl. .................................................. 350/356
[58] Field of Search ............... 350/356, 311, 316, 166, 350/164; 331/94.5 C, 94.5 M

[56] References Cited

U.S. PATENT DOCUMENTS

| | | | |
|---|---|---|---|
| 3,307,897 | 3/1967 | Lohmann | 350/160 |
| 3,573,653 | 4/1971 | Smiley | 331/94.5 C |
| 3,573,654 | 4/1971 | Smiley | 331/94.5 C |
| 3,579,130 | 5/1971 | Smiley | 331/94.5 C |
| 3,943,552 | 3/1976 | Shannon et al. | 357/15 |
| 4,201,954 | 5/1980 | Van der Wal et al. | 331/94.5 C |

OTHER PUBLICATIONS

"Induced Transmission in Absorbing Films Applied to Band Pass Filter Design" Berning et al; *Jour. of Opt. Soc. of Amer.* vol. 47, No. 3 Mar. '57, 830.

*Primary Examiner*—William L. Sikes
*Assistant Examiner*—Léon Scott, Jr.
*Attorney, Agent, or Firm*—Robert F. Beers; W. Thom Skeer; Kenneth G. Pritchard

[57] ABSTRACT

A semi-conductor multi-color tunable filter is created by multiple epitaxial layers of varying composition. An AC modulation voltage is superimposed on a sweep bias to periodically shift the fundamental absorption edge of each individual epitaxial layer. This arrangement permits a unique voltage to be associated with a particular color. A lock-in filter matches colors observed at a detector with the voltage present for a given observation.

7 Claims, 3 Drawing Figures

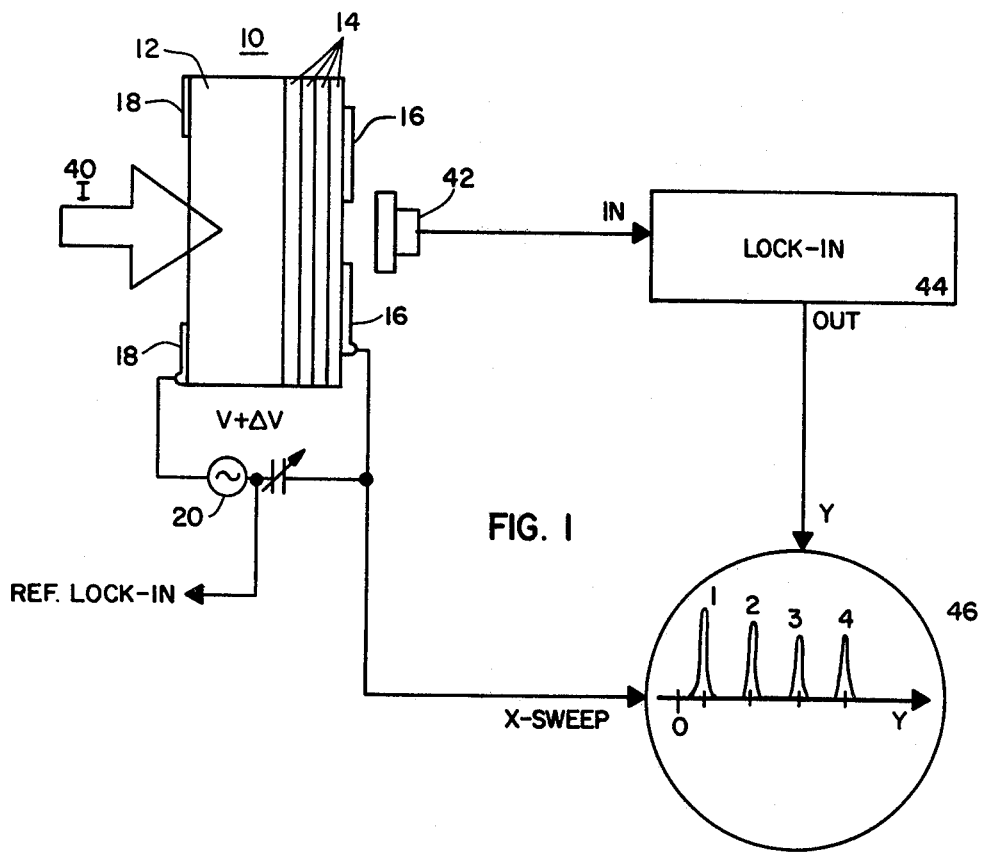
FIG. 1
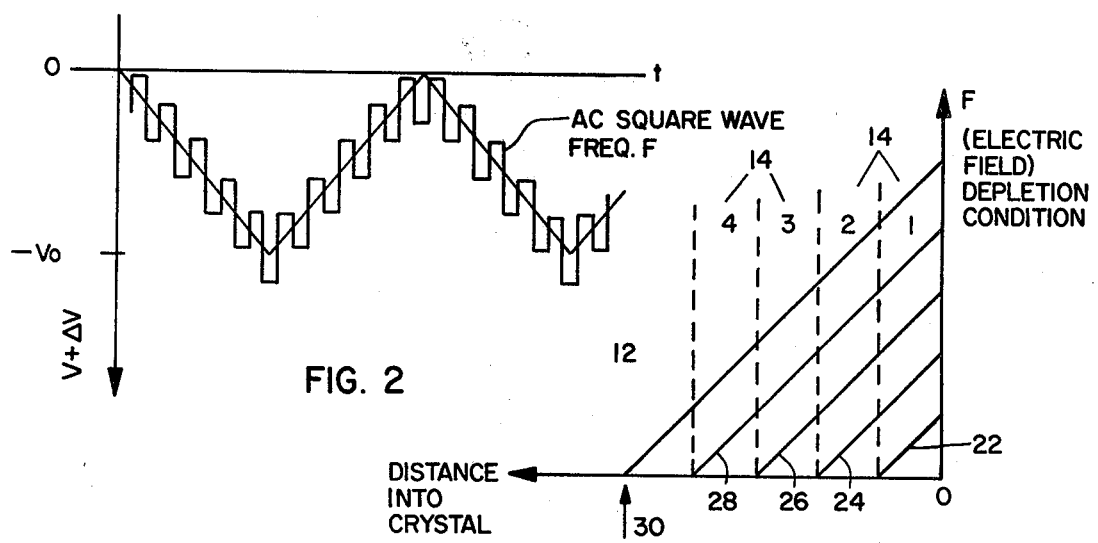
FIG. 2
FIG. 3

MULTI-COLOR TUNABLE FILTER

BACKGROUND OF THE INVENTION

1. Field of the Invention

The pesent invention is for semi-conductor filters. Specifically this invention is for a multi-color tunable filter using epitaxial layers.

2. Description of the Prior Art

Modern electromagnetic spectrum studies permit identification of objects by characteristic frequency signatures. In particular, target emission in the infrared region appears to be highly reliable as a means of identifying targets.

Previous detectors have not permitted rapid scanning of several colors. To cover a portion of the spectrum, numerous detectors tuned to narrow adjacent bandwidths have had to be used. Each detector has a predetermined band gap energy. Light whose energy matches this amount is absorbed according to the photoelectric effect, $E=(hc/\lambda)$, where E is the band gap energy, h is Plank's constant, $\lambda$ is the wavelength of the light in question, and c is the speed of light.

It is also possible to communicate by discrete frequency shifts. However, present lasers can selectively shift frequencies at a faster rate than current receivers can decode. Thus, present receivers limit the rate of communication.

SUMMARY OF THE INVENTION

A multi-color tunable filter, suitable for white light, is made of N-type $GaAs_{1-x}Sb_x$ heterostructures. Light to be analyzed is filtered by a semi-conductor device having a substrate and a plurality of expitaxial layers. Electrodes are placed on the substrate and uppermost epitaxial layer.

A sweeping voltage source capable of depleting across all epitaxial layers is connected to the electrodes and an AC modulating voltage is superimposed upon it. The DC sweep voltage shifts the absorption edge of the individual layers, while the AC voltage modulates that absorption with a frequency f.

A detector is placed behind the semi-conductor device to measure the difference in light intensity for each layer of the device. By varying the value of X, each layer absorbs a different color. The AC modulation permits a comparison of the light passing through each layer as the voltage switches above and below the threshold set by the sweep bias.

BRIEF DESCRIPTION OF THE DRAWINGS

FIG. 1 shows an embodiment of the present invention;

FIG. 2 shows a type of modulation voltage that can be used with the present invention; and FIG. 3 is a graph of Electric Field vs Distance into crystal for various bias voltages.

DESCRIPTION OF THE PREFERRED EMBODIMENT

In FIG. 1, a semi-conductor device 10 is shown with a substrate 12 and a plurality of epitaxial layers 14. Substrate 12 can be made of N+ GaAs and epitaxial layers 14 can be made of N-type $GaAs_{1-x}Sb_x$ heterostructures where X equals the mole fraction of Sb normalized to the number of As atoms. The relationship of the choice of mole fraction X to band gap energy is well known, for example, "Growth and Properties of Liquid-Phase Epitaxial $GaAs_{1-x}Sb_x$" by R. E. Nahory, M. A. Pollack, J. C. DeWinter, and K. M. Williams, J. of Appl. Physics, Vol. 48, No. 4, Pages 1607–1614, April 1977. A total of four epitaxial layers 14 are shown in FIG. 1, but many more can be used. For each epitaxial layer 14, the composition of the layer fits the $GaAs_{1-x}Sb_x$ format, but the value of X is different for each layer. The value of X is incrementaly varied for each layer. Each layer acts as a filter for a unique color. Epitaxial layers 14 are thin enough to be depleted across with a negative bias voltage, V. To deplete across all layers, a final achievable voltage, $-V_o$, must be obtained. Individual layer thickness of 0.5 to 1.0 $\mu$m with a carrier concentration of $10^{16}$ cm$^{-3}$ permit this to be achieved. There must be good lattice matching between epitaxial layers 14 to avoid additional potential barriers due to interface state density.

Electrodes are placed on semi-conductor 10 so a voltage potential can be maintained across device 10. On the uppermost epitaxial layer, an apertured Schottky barrier contact 16 can be used or a P+ thin epitaxial layer. Schottky contact 16 can be a platinum-gold contact. On the bottom of substrate 12, ohmic contacts 18 are used. Ohmic contacts 18 can be gold-germanium contacts.

A variable voltage source 20 is connected to the electrodes of device 10 as shown. Voltage source 20 is capable of providing a sweep bias and superimposing on the bias an AC modulated voltage.

FIG. 2 is a graph of a negative sweeping bias voltage, V, with AC square-wave modulation voltage, $\Delta V$, superimposed. Other voltage vs time relationships can be used, but squarewave modulation of a linear voltage is a straight forward example. The negative sweep bias will cause each layer to sustain the electric field. The AC modulating field will periodically shift the fundamental absorption edge of the individual layer that is sustaining the electric field.

FIG. 3 is a graph of the electric field vs distance into the device 10 or crystal for different biasing voltages. Layer 1, the uppermost of epitaxial layers 14 can have a built-in field bias for zero voltage as shown by line 22. At increasing voltages 24, 26, 28 and 30, the electric field depletion condition shifts into lower layers until the maximum depletion depth is reached at $-V_o$, shown by line 30.

In FIG. 1, incident light 40, which can be polychromatic or monochromatic, enters device 10 with incident intensity I. The portion of incident light 40 which exits device 10 impinges on a detector 42. Detector 42 can be a Si PIN-10 or any other narrow bandwidth $GaAs_{1-x}Sb_x$ inverted heterostructure detector spanning all the colors in the filter. Detector 42 will measure the change in exit light intensity $\Delta I$ for each wavelength of light near the absorption edge of the individual epitaxial layer. Detector 42 is connected to a lock-in amplifier 44 set on the modulating frequency, f. The output of lock-in amplifier 44 is connected to a display device 46, such as a cathode ray tube. Display device 46 can also be connected to variable voltage source 20 to signal response in each of the layers shown in FIG. 1. The FIG. 1 image shows all four layers absorbing light, thus for this example, all four colors capable of being measured were present in incident light 40.

Lock-in amplifier 44 is also connected to a reference signal from variable voltage source 20. Lock-in amplifier 44 extracts the particular color signal by comparing the change in light intensity ΔI in each layer caused by the AC modulation shifting the fundamental absorption edge back and forth in each layer. If absorption occurs, then that particular frequency is present in incident light 40. There is a unique voltage associated with each color that can be absorbed in epitaxial layers 14.

It is obvious to those skilled in the art that numerous variations to this device can be made.

What is claimed is:

1. A multi-color tunable filter for light comprising:
   a substrate in the path of light for transmitting said light;
   a plurality of epitaxial layers on said substrate, placed such that said light passes through said plurality of epitaxial layers after passing through said substrate, for filtering selected wavelengths;
   means for producing a variable voltage potential across said substrate and epitaxial layers in a predetermined manner;
   a detector placed to intercept said light after it has passed through said epitaxial layers for measuring the amount of light that has passed through said substrate and epitaxial layers;
   a lock-in set to the predetermined manner in which said voltage varies and electrically connected to said detector for extracting a particular color signal as a function of the change in the output of said detector; and
   means for displaying the actual colors present in said light.

2. A multi-color tunable filter for light as described in claim 1 wherein said voltage means comprises;
   electrical contacts placed on the unfiltered side of said substrate and on the outermost layer of said plurality of epitaxial layers;
   a variable voltage source electrically connected to said electrical contacts for depleting said epitaxial layers with a negative sweep bias that reaches a final voltage, $-V_o$, that depletes across all epitaxial layers; and
   means for superimposing an AC modulation voltage on said negative sweep bias.

3. A multi-color tunable filter for light as described in claim 2 where said AC modulation means comprises a squarewave generator of predetermined frequency, f.

4. A multi-color tunable filter for light as described in either claim 2 or claim 3 where said electrical contacts comprise a platinum-gold Schottky contact on the epitaxial layer side and gold-germanium ohmic contacts on the substrate side of said filter.

5. A multi-color tunable filter for light as described in claim 1 where said substrate comprises N+ type GaAs.

6. A multi-color tunable filter for light as described in any of claims 1, 2, 3 or 5 wherein said plurality of epitaxial layers are comprised of N type $GaAs_{1-x}Sb_x$, where X equals the mole fraction of GaSb normalized to the number of As atoms.

7. A multi-color tunable filter for light as described in any of claims 1, 3 or 5 where said display means is a cathode-ray tube.

* * * * *